B. G. GILBOUGH.
PRESSURE GAGE FOR TIRES.
APPLICATION FILED MAY 23, 1917.

1,322,782.

Patented Nov. 25, 1919.

Inventor
Benjamin G. Gilbough,
by James T. Bayleless
his Attorney.

UNITED STATES PATENT OFFICE.

BENJAMIN G. GILBOUGH, OF LOS ANGELES, CALIFORNIA.

PRESSURE-GAGE FOR TIRES.

1,322,782.     Specification of Letters Patent.     Patented Nov. 25, 1919.

Application filed May 23, 1917. Serial No. 170,409.

*To all whom it may concern:*

Be it known that I, BENJAMIN G. GIL-BOUGH, a citizen of the United States, residing at Los Angeles, in the county of Los Angeles, State of California, have invented certain new and useful Improvements in Pressure-Gages for Tires, of which the following is a specification.

This invention relates to pressure gages for inflatable tires of all kinds; and it is an object of this invention to provide a simple, reliable and easily applied device which may be permanently set in operative relation with the tire and which will continuously indicate the inflation pressure of the tire.

It is a feature of this invention that I utilize the external pressure of the inflated tire to operate the pressure indicating or registering means; in contradistinction of the usual use of the air pressure from within the tire. Typically, in an actual construction embodying my invention, I use a mechanism comprising essentially two relatively movable elements, one of which is pressed against by the exterior wall of the tire—that is by the inner tube of the tire. I utilize some means, preferably a resilient means, to oppose the movement of this indicator member caused by the inflation of the tire. This resilient means may be, for instance, a spring, or a confined body of gas, as is more fully hereinafter described. The relatively movable member or element of the indicator may be a special element which I provide, or it may be, as specified in an application co-pending herewith, the regular valve stem of the tire. In said co-pending application I claim the particular features shown and described therein, including the use of the valve stem as the relatively movable element of the indicator means, and including also the use of a spring as a resilient means to oppose the pressure induced movement of that movable element. In the present application, I describe and claim broadly the arrangement and operation of the movable element by the external inflation pressure of the tire wall or tube, and also certain particular details of a form of this device in which a diaphragm chamber containing a liquid forms a relatively movable element of the indicator, the liquid being moved against the pressure of a confined body of air in a tube, and the level of the liquid indicating the pressure.

Figure 1:
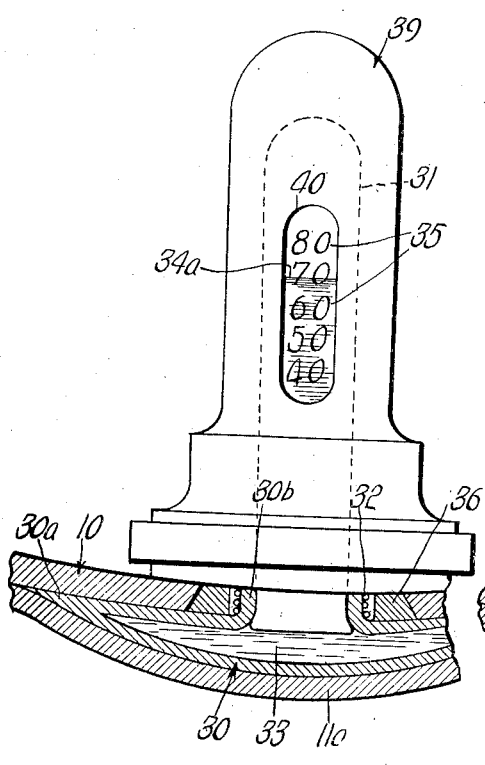
Figure 2:
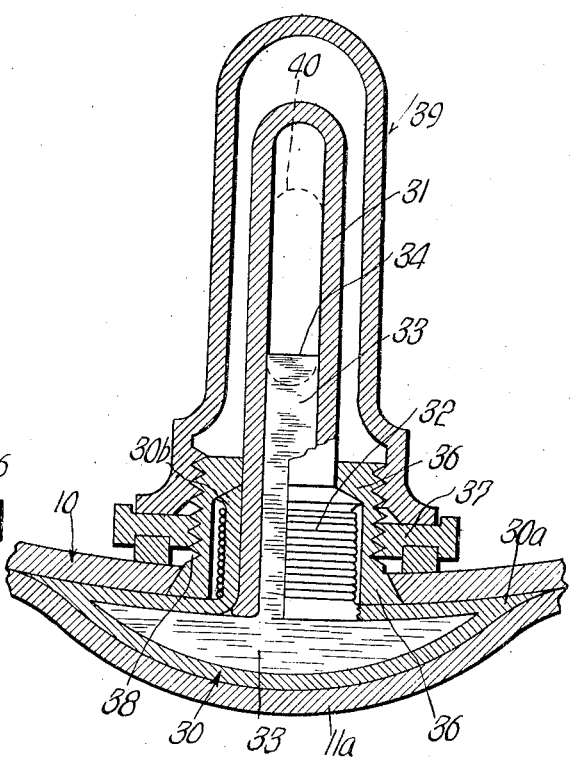

I now proceed to detail the description of a preferred form of device embodying my invention. From this description the general nature of my invention will be readily understood; and I do not describe this specific preferred form with a view to limiting my invention thereto, but rather with a view of indicating what the invention may be. For the purpose of the following detailed specification, I now refer particularly to the accompanying drawings in which Figure 1 is a view showing one form of my device in elevation applied to a rim and tire; Fig. 2 is a sectional view of the same.

Referring now to the drawings I show the inner tube 11ª of the tire pressing against what I may term a diaphragm chamber 30 which is located on the outer surface of the rim 10. This diaphragm chamber projects beyond the outer surface of the rim, so that the tire wall 11ª is indented by it and so that a definite area of the tire wall lies against the diaphragm chamber. This diaphragm chamber 30 may be made of any suitable material which will change its form as indicated. Fig. 1 shows the device in such position as it assumes at a relatively high pressure, while Fig. 2 shows the device in such a form as it assumes at a relatively low pressure in the tire. For instance, this diaphragm chamber may be made of rubber or the like. Its shape is more or less immaterial; but its sectional configuration I prefer to make as shown in the drawings with thin edged portions as shown at 30ª. This diaphragm chamber is connected, and communicates in some manner, with a tube 31, preferably made of glass. The juncture between the diaphragm chamber and the tube may be effected in any desired manner, as by having a neck 30ᵇ of the diaphragm chamber fit around the outer end of the tube 31 and held thereon by a wire winding as shown at 32. The diaphragm chamber and tube 31 are partially filled with a liquid as shown at 33; and I preferably select a liquid which has a minimum change of volume due to changes of temperature. The liquid will normally stand at some level such as indicated at 34; but when the inflation pressure in the tire is raised, then the diaphragm chamber 50 is compressed, and the liquid level will rise as shown at 34ª in Fig. 1. The glass tube 31 may carry pressure designations as indicated at 35, and the liquid level is read by these pressure designations.

The tube 31 and the neck 30ᵇ of the diaphragm chamber are held in a plug 36 rigidly and permanently mounted upon the rim 10 by means of a nut 37 screwing down on screw threads 38; and a cap 39 covers the whole device, being provided with a window 40 through which the designations 35 and the liquid level 34 may be seen.

This form of device utilizes the external inflation pressure of the tire; the tire wall bearing against the relatively movable element of the device. In this case the relatively movable element is the diaphragm chamber and the liquid it contains; and the resilient element which opposes the movement of the movable element is the air confined in the tube 31 above the liquid level. This device does not have to be removed from the rim when the tire is changed, but is put upon the rim as a permanent fixture to permanently and continuously indicate the tire pressure.

As I have hereinbefore indicated, my device may be applied to any kind of a rim or the like which carries a tire. It will be evident that my device may be as easily applied to a thick wheel felly or to a demountable rim which is placed upon a thick wheel felly as it is to the thin rim of a demountable wheel.

I have illustrated my device larger than it necessarily may be in actual use. In actual size my device is very small, the caps 22 and 39 being somewhat comparable in size with the caps now in common use to cover tire valve stems.

I conceive of my invention as being broad in its scope and not limited to specific details such as herein described. These specific details and designs may be varied and modified as will be apparent to those skilled in the art. The following claims are therefore intended to cover my invention in its broader aspects as well as in those certain specific aspects herein described.

Having described a preferred form of my invention, I claim:

1. In combination with an inflatable tire, a fluid holding chamber, a liquid carrying diaphragm chamber in communication with the fluid chamber, means for holding the diaphragm chamber against the exterior of the tire so that inflation expansion of the tire causes compression of the diaphragm chamber, a liquid in the diaphragm chamber and partly filling the fluid chamber, the fluid chamber being closed except for its connection with the diaphragm chamber and holding a gas which is compressed by the liquid when the diaphragm chamber is compressed.

2. In combination with an inflatable tire and a rim, a fluid holding tube closed at its outer end and mounted on the rim at its inner end, a liquid holding diaphragm chamber in communication with the inner end of the tube, confined between the rim and tire and exteriorly bearing against the tire to be compressed by inflation of the tire, and a liquid in the diaphragm chamber partly filling the fluid chamber, the remainder of the fluid chamber holding a gas which is compressed when the diaphragm chamber is compressed.

3. In combination with an inflatable tire, a liquid holding diaphragm having a flexible wall, means for holding the chamber confined against the tire so that inflation pressure of the tire causes compression of the diaphragm chamber, a liquid in the chamber, and means for indicating by virtue of the movement of the fluid the amount of compression of the chamber.

4. In combination with an inflatable tire and a rim, a fluid holding diaphragm chamber having a flexible wall confined against the tire so that inflation pressure of the tire causes compression of the chamber, a fluid in the chamber, and means to indicate the amount of compression of said fluid.

5. In combination with an inflatable tire, a flexible diaphragm member of definitely delimited area held superficially against the tire over a certain definite area thereof, supporting means for the diaphragm member, means including a resilient element opposing the displacement of said diaphragm by the inflation pressure of the tire, and means to indicate the amount of diaphragm displacement.

In witness that I claim the foregoing I have hereunto subscribed my name this 11th day of May 1917.

BENJAMIN G. GILBOUGH.